Nov. 30, 1965     S. ZWART     3,220,854
METHOD OF CURING BACON SLICES
Filed Feb. 27, 1961
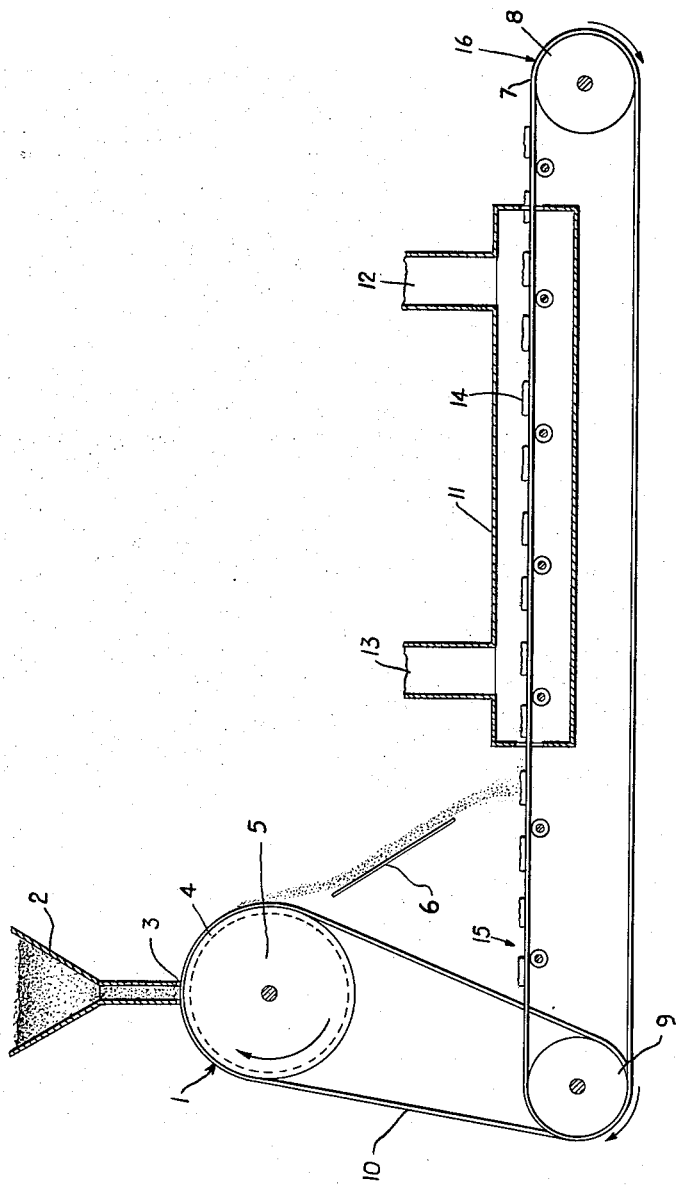
INVENTOR.
SIMON ZWART
BY Brumbaugh, Free,
Graves & Donohue
his     ATTORNEYS United States Patent Office 3,220,854
Patented Nov. 30, 1965

3,220,854
METHOD OF CURING BACON SLICES
Simon Zwart, Oss, Netherlands, assignor to Thomas J. Lipton, Inc., Englewood Cliffs, N.J., a corporation of Delaware
Filed Feb. 27, 1961, Ser. No. 91,805
Claims priority, application Great Britain, Mar. 7, 1960, 8,062/60
7 Claims. (Cl. 99—159)

This invention relates to the preparation of meat products, and is particularly concerned with the preparation of packed, cured and matured meat slices, especially packed bacon slices.

The curing of meat, as for instance, in the preparation of bacon and ham, has been carried out from early times by methods which have become traditional in the industry. According to such methods, sides of bacon pigs are immersed in strong brine, containing other salts necessary or advantageous for the curing, notably alkali metal nitrates and nitrites. The sides are allowed to remain in the brine for a long time, generally about 5 days, and are then removed from the brine and allowed to mature in the air for a further period, generally about 10 days. During this period the pink color characteristic of bacon develops in the lean pig meat. An alternative process is dry salting, in which salts are rubbed into the sides of dry meat and the meat is exposed to the air for a long time, generally for some weeks. That such processes are so time-consuming is obviously disadvantageous, but it has been persistently believed in the industry that times of treatment of the order given above are essential to obtain the desired flavor, color and shelf-life in bacon and ham.

The present invention provides a much more rapid method for the preparation of packed, cured and matured meat slices, especially packed bacon slices. According to the said method the meat is sliced, curing salt in solid particulate form is applied to the surface of each slice, the slices are thereafter packed in air-impermeable moisture-proof containers and sealed therein in the substantial absence of free oxygen, and are matured therein. Preferably, application of the salt is effected by sprinkling it on to the meat slices. Naturally, it is advantageous that the salt should be distributed substantially uniformly over the whole surface of the slice. Contrary to expectation, however, it has not been found necessary to apply salt to both surfaces of the slice: the improvement in shelf-life obtained by so doing is relatively small.

The method of the invention makes it possible to prepare in a relatively short time packages of cured and matured bacon slices of excellent flavor and appearance, free from excessive moisture and of long shelf-like in the package at moderate temperatures.

In practicing the invention, a small proportion of alkali metal nitrite, for example, sodium nitrite, is generally added to the slices of meat. The nitrite in solid form may, for instance, be incorporated in the solid curing salt (the basis of which will generally be sodium chloride) to be used for treating the meat slices. Preferably, however, the nitrite is applied in aqueous solution and it has been found advantageous to treat the slices with the nitrite solution before application of the salt. Thus, for instance, the slices can be sprinkled first with the nitrite solution and then with dry finely divided sodium chloride.

The amount of sodium chloride applied will depend on the concentration of sodium chloride required in the product. Excellent results have been obtained with relatively low proportions of sodium chloride, for instance, 3 to 5 or 6% based on the weight of the slice. Considerably higher proportions may, however, be employed, for instance, 9 to 12% based on said weight.

The proportion of alkali metal nitrite may also vary according to the product required. Very good results, for instance, have been obtained using 0.05 to 0.1 or 0.2% of sodium nitrite based on the weight of sodium chloride, and equivalent proportions of other alkali metal nitrites can be used.

With a view to still further improving the shelf-life of the products there may also be incorporated in the meat a small proportion, for instance 0.05 to 0.1 or 0.2% based on the weight of sodium chloride, of alkali metal nitrate. This provides a reservoir from which further nitrite ions can be drawn by biological reduction during the shelf-life of the products. The nitrate may, for instance, be incorporated in the dry curing salt to be applied to the slices or in an alkali nitrite solution sprayed on to the slices.

To obtain the best results according to the invention, the dry curing salt applied should be in the form of a free-flowing powder.

Generally, it is preferred to use slices of about 2 mms. to about 8 mms. in thickness, but the thickness may be varied as desired, and slices of 25 mms., or even more, in thickness can be used.

Maturing of the treated meat slices in the substantially complete absence of free oxygen is preferably effected by vacuum-packing the slices in a bag made of suitable substantially moisture-proof air-impermeable plastics material. As used herein, the term "moisture-proof" material means a material having a water-vapor permeability not greater than about 2 g. per day per sq. meter measured according to the Patra method as described in "Verpackungs-rundschau," 1959, pages 65 and 66: "air-impermeable" material means a material with an oxygen permeability not greater than about 2 g. per day per sq. decimeter for one atmosphere difference in pressure at a relative humidity of about 85% as measured according to the volume changing method described on pages 68 and 69 of the above-mentioned publication.

As suitable packaging material for use according to the invention there may be mentioned a laminated material consisting of regenerated cellulose (45 g./m.$^2$) coated on both sides with polyvinylidene chloride (4 g./m.$^2$) and coated also on one side with a layer of polyethylene (50 g./m.$^2$) the latter layer being usually the inside layer of the bag to be used for packing. This material is commercially known as Saran-coated Cellothene.

Another suitable material is a polyvinylidene chloride film having a thickness of about 50 microns.

Still another suitable material comprises a 40-micron thick layer of substantially unplasticized polyvinyl chloride, laminated with a thin layer of the same material, the laminate being further coated on one side with a 25-micron thick layer of polyvinylidene chloride.

Also a 40-micron thick cellulose acetate film laminated with a 15-micron thick layer of aluminium, onto which a 30-micron layer of polyethylene has been extruded, is a suitable material.

It is preferable for the time that elapses between applications of the curing salts and sealing in the oxygen free enclosure to be as short as possible. Although useful results have been obtained even when this period is as long as six hours, with a view to obtaining long shell-life, it should preferably be not longer than 30 minutes and the best results have been obtained at periods between one and ten minutes, and especially between one and five minutes. It is an important advantage of the method of the invention that the vacuum-packing can be effected substantially immediately after application of the curing salt.

It has been found that when treated pig meat slices are allowed to remain in the oxygen free environment for a suitable maturing period, for instance for 12 hours at 20° C., or for about 2 days at 5° C., the characteristic pinkish color of bacon develops uniformly throughout the slices. Slices of excellent flavor can be obtained in this way. A shelf-life of 4 months or more, determined with respect to taste, smell, appearance and color of the meat can be obtained by storing the slices at 5° C. Preferably, the packed slices are stored for some hours at approximately room temperature to accelerate maturing, and thereafter at about 5° C.

It may be difficult to obtain a thorough salting of the edges of the slices, especially when these edges are particularly fatty. Consequently, even better results can be obtained by immersing the meat, before the slicing, for a short time (not longer than one day) in brine.

The addition of sodium ascorbate may reduce the period in which the desired pinkish color is developed. After one month's storage, however, the taste of slices treated in this way is usually rather acid or acrid.

Smoking of the meat may take place before or after the slicing. Preferably the meat is smoked after the salting.

The process of the invention, though it may be carried out as a batch process is preferably operated as a continuous process, for example, as follows: the sides or blocks of pig meat are sliced continuously, the slices are dropped onto a long conveyor belt at the beginning of which they are salted by sprinkling curing salt over their exposed surfaces (preferably after sprinkling them with a dilute aqueous solution of alkali metal nitrite, for example a 0.5 to 2% aqueous solution of sodium nitrite), and are then carried by the belt through a smoke tunnel, where they meet a counter-current of smoke, to a packing station where they are vacuum-packed in air-impermeable moisture-proof containers.

One form of apparatus suitable for use in carrying out the process continuously will now be described by way of example, with reference to the accompanying diagrammatic drawing:

A salt dispenser 1 comprises a hopper 2 the outlet 3 of which registers with a circumferential recess 4 in a dispenser roll 5. A chute 6 is arranged to distrtbute salt discharged from the recess in the dispensing roll over the surface of meat slices passing beneath the chute. Conveying means for the meat slices is provided by a conveyor belt 7 of open-work woven construction, driven by a driving roll 8 and running round an idle roll 9. The dispenser roll is geared by means represented diagrammatically by the belt 10 to the idle roll 9 so as to synchronize the movement of the roll with that of the conveyor. A smoke chamber 11 having a smoke inlet 12 and an outlet 13 connected to an exhaust fan (not shown) surrounds part of the path of conveyor belt 7. At the discharge end of the conveyor, vacuum-packing means (not shown) are provided.

In operation, slices 14 of pig meat (which for clarity are shown widely spaced apart) are fed onto the moving conveyor at a feed station 15 whence they are carried under the chute 6, where each slice receives a proportion of salt substantially uniformly distributed over its surface, and then through the smoke chamber 11 to a discharge station 16, where they are vacuum-packed in moisture-proof air-impermeable plastic bags.

The following examples illustrate the invention.

*Example 1*

Fresh pig meat was sliced to form slices 2 to 4 mm. thick and curing salt consisting of 99.8 to 99.9% by weight of sodium chloride and 0.1 to 0.2% of sodium nitrite in the form of a free-flowing powder, was sprinkled uniformly to the extent of 4 to 6% based on the weight of the meat over one side of each slice as the slices were moving in succession on a conveyor belt past a salt dispenser into a smoke tunnel. During passage through the smoke tunnel the slices were smoked in the course of 3 to 5 minutes. Immediately beyond the smoke tunnel the slices were packed in bags of regenerated cellulose coated on the outer side with polyvinylidene chloride and on the inner side first with a coating of polyvinylidene chloride and then with a coating of polyethylene. The bags containing the meat slices were evacuated and heat-sealed.

The packed slices were allowed to mature at 20° C. for 12 hours in the bags. At the end of this period the pink color characteristic of cured-matured bacon had developed all over the surface of the lean meat.

Some of the bags were stored at 20° C. and the shelf-life of the product was found to be about 3 weeks at this temperature. The remainder of the bags were stored at 5° C. and the shelf-life at this temperature was found to be more than 4 months.

*Example 2*

The process was carried out as in Example 1 except that the pig meat treated had been immersed for 12 hours in a 20% aqueous solution of sodium chloride before slicing.

The results were substantially the same as those of Example 1 except that the shelf-life was considerably extended, being 4 weeks even at 20° C.

*Example 3*

The process was carried out as in Example 1 except that the ripening was effected at 5° C. The results were substantially the same as in Example 1 except that the color development took several days at this temperature and the shelf-life of a product subsequently kept at 20° C. was about one month.

*Example 4*

The process was carried out as in Example 3 except that the sliced meat was sprinkled first with a 1% aqueous solution of sodium nitrite and then with solid finely divided sodium chloride.

The color change characteristic of the matured product occurred within 12 hours and the shelf-life was found to be about 40 days at 20° C. and above 5 months at 5° C.

*Example 5*

The process was carried out as in Example 4 except that the meat slices were obtained by soaking fresh pig belly in 1% aqueous sodium nitrite solution for 12 hours.

The shelf-life of the product at 5° C. was found to be about 6 months.

I claim:

1. A method of preparing bacon which comprises slicing pork meat, impregnating the slices with 3 to 12% of their weight of curing salt comprising sodium chloride and 0.05 to 0.2% of sodium nitrite based on the weight of sodium chloride, sealing the impregnated slices in an air-impermeable moisture-proof container in the substantial absence of free oxygen not more than six hours after impregnation and allowing them to mature in the container until color characteristic of cured, matured bacon has developed all over the surface of the lean meat, the impregnation with at least the sodium chloride component of the curing salt being effected by sprinkling of said component in the form of a free-flowing powder uniformly over the surface of each slice.

2. A method according to claim 1, wherein the impregnated slices are sealed within 30 minutes of the sprinkling with the curing salt.

3. A method according to claim 1, wherein at least the sodium chloride component of the curing salt is sprinkled uniformly over one surface only of each slice in turn while the slices are being carried in succession and lying flat along a predetermined path, at the end of which the sealing in the container is effected within one to ten minutes of the sprinkling with the salt.

4. A method according to claim 3, wherein an atmosphere of curing smoke is provided to the slices during their passage along the predetermined path.

5. In a method according to claim 1, the step of soaking the intact pig meat in an aqueous solution of sodium chloride of about 20% concentration by weight for about 12 hours and, after slicing, effecting the impregnation with at least the sodium chloride component of the curing salt by sprinkling of said component in the form of a free flowing powder uniformly over one surface only of each slice in turn while the slices are being carried in succession and lying flat along a predetermined path at the end of which the sealing in the container is effected within one to ten minutes of the sprinkling with the salt, said predetermined path passing through an atmosphere of curing smoke.

6. In a method according to claim 1, the step of soaking the intact pig meat in an aqueous solution of sodium nitrite of about 1% concentration by weight for about 12 hours and, after slicing, effecting the impregnation with at least the sodium chloride component of the curing salt by mere sprinkling of said component in the form of a free flowing powder uniformly over one surface only of each slice in turn while the slices are being carried in succession and lying flat along a predetermined path at the end of which the sealing in the container is effected within one to ten minutes of the sprinkling with the salt, said predetermined path passing through an atmosphere of curing smoke.

7. In a method according to claim 1, the steps of first applying the sodium nitrite required by sprinkling uniformly over one side only of each slice an aqueous solution of sodium nitrite containing 0.05 to 0.2% thereof based on the weight of sodium chloride to be incorporated, and then effecting the impregnation with sodium chloride by sprinkling thereof, in the form of a free flowing powder, uniformly over the same side of each slice, the sealing being effected within one to ten minutes of the application of said powder.

References Cited by the Examiner

UNITED STATES PATENTS

| | | | |
|---|---|---|---|
| 2,461,291 | 2/1949 | McKee | 99—159 |
| 2,627,473 | 2/1953 | Brissey | 99—159 X |
| 2,902,369 | 9/1959 | Komarik | 99—159 |
| 2,974,047 | 3/1961 | Holmes | 99—159 X |

A. LOUIS MONACELL, *Primary Examiner.*

HYMAN LORD, WILLIAM B. KNIGHT, *Examiners.*